United States Patent [19]

Skeath

[11] Patent Number: 4,828,448

[45] Date of Patent: May 9, 1989

[54] NON-CONSOLIDATING DISCHARGE FEEDER

[75] Inventor: Arthur D. L. Skeath, North Vancouver, Canada

[73] Assignee: UKAF Industries, Inc., North Vancouver, Canada

[21] Appl. No.: 944,426

[22] Filed: Dec. 19, 1986

[30] Foreign Application Priority Data

Dec. 19, 1985 [CA] Canada ............................. 498184

[51] Int. Cl.⁴ ............................................. B65G 65/42
[52] U.S. Cl. ................................. 414/304; 198/532; 198/550.2; 222/526
[58] Field of Search ............... 414/293, 300, 304, 325, 414/327, 414, 507, 527, 528; 198/525, 532, 550.5, 364; 222/409, 526, 353, 504

[56] References Cited

U.S. PATENT DOCUMENTS

| | | | |
|---|---|---|---|
| 3,991,493 | 11/1976 | Orth | 414/527 X |
| 4,119,193 | 10/1978 | Smith et al. | 414/304 X |
| 4,553,660 | 11/1985 | Bennett et al. | 198/352 X |
| 4,744,459 | 5/1988 | Ryan | 198/364 X |

FOREIGN PATENT DOCUMENTS

| | | |
|---|---|---|
| 177374 | 1/1954 | Austria . |
| 358296 | 2/1936 | Canada . |
| 582586 | 8/1933 | Fed. Rep. of Germany . |
| 1068632 | 11/1959 | Fed. Rep. of Germany . |
| 1481407 | 4/1969 | Fed. Rep. of Germany . |

*Primary Examiner*—David A. Bucci
*Attorney, Agent, or Firm*—Trask, Britt & Rossa

[57] ABSTRACT

Previously belts, drag chains or screw feeders have been used to discharge a bulk material, such as wood pulp and the like, from a storage bin or hopper at the required rate. A problem with such feeders is obtaining uniform withdrawal of material from the full area of the bin, as typically some areas of the bin remain stagnant, and further there may be areas of consolidation and compaction of the bulk material against the walls of the bin. The present invention overcomes these problems by providing a discharge feeder in which an opening of selected width travels back and forth uniformly under the bin outlet. By a system of belts and pulleys, the surface of the feeder in contact with the bulk materials remains stationary with respect to the materials, while the opening itself traverses the length of the bin, allowing a uniform non-consolidating feed of the bulk materials.

11 Claims, 7 Drawing Sheets

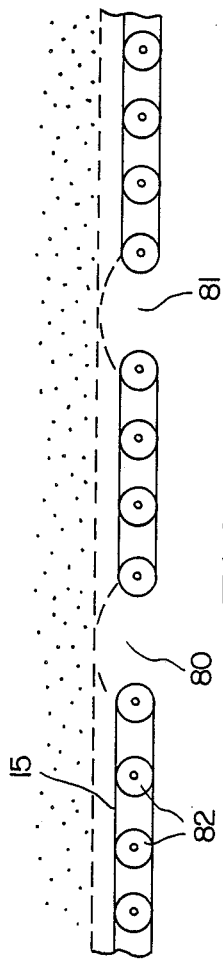
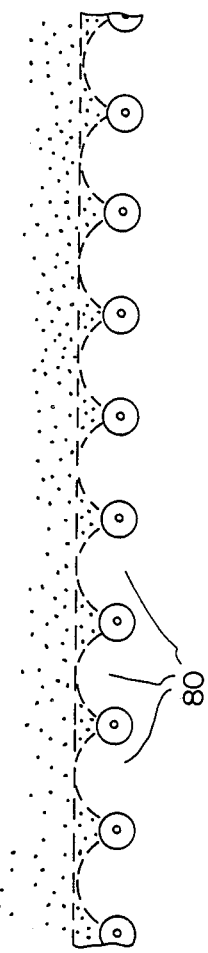

NON-CONSOLIDATING DISCHARGE FEEDER

BACKGROUND OF THE INVENTION

The present invention relates to a discharge feeder to withdraw a bulk material from a storage bin or a hopper under controlled conditions. Belt, drag chain, and screw feeders are commonly used to discharge a bulk material from a storage bin or a hopper at the required rate. A major problem with such feeders, particularly for long storage bins or hoppers, is obtainining uniform withdawal of material from the full area of the bin or hopper outlet. Such feeders tend to withdraw material predominantly from the rear of the bin or hopper, material at the front end of the bin or hopper remaining stagnant. The action of such discharge feeders also results in the transfer of stresses into the bulk material at the outlet, resulting in the consolidation and compaction of the bulk material against the front wall of the bin or hopper. The consolidation and compaction is particularly severe for bulk materials with high internal resistance to shearing, for example, wood residue and other fibrous materials. Consolidation and compaction of wood residues may occur over a considerable distance above such discharge feeders and results in severe bridging problems leading to stoppages in the flow of the stored bulk material. Other problems that occur with commonly used discharge feeders is excessive power requirement and physical damage to the stored bulk material as a result of the shearing action of the discharge feeder.

SUMMARY OF THE INVENTION

The present invention provides a discharge feeder that withdraws a bulk material uniformly from the full length of a bin or a hopper irrespective of its length and without introducing any consolidation stress into the material. This is accomplished by providing a discharge feeder to withdraw a bulk material from a storage bin or a hopper under controlled conditions. The feeder, located at the outlet of a bin or a hopper, consists of an opening extendign across the bin outlet. On each side of the opening is a flexible belt. The belt may be sufficiently stiff to be self-supporting or may rest on a supporting deck. The belts loop back via pulleys or shafts, covering the remainder of the bin or hopper outlet on both sides of the opening. The opening traverses back and forth along the length of the bin while at the same time the belts remain stationary relative to the stored material above them. A moving opening between stationary belts as described above is achieved by having the belt unfold from under the bin or hopper outlet at the leading edge of the opening and at the same time, cover the bin or hopper outlet at the trailing edge of the opening. The supporting decks under the belts also traverse with the opening.

As the opening traverses the length of the bin, a uniform cut of the bulk material is taken from the full cross-sectional area of the bin. The lack of any sliding motion between the top of the belts and the stored bulk material at the outlet avoids the introduction of any stress into the bulk material. According to one aspect of the invention, the width of the opening is chosen that that when the opening is stationary, limited flow of the stored bulk material takes place as a stable arch is formed above the opening.

BRIEF DESCRIPTION OF THE DRAWINGS

In drawings which illustrate embodiments of the invention:

FIG. 6 is a simplified plan view of a section of a further embodiment of the invention utilizing multiple openings.

FIG. 7 illustrates a further embodiment of the invention which does not require a flexible belt.

DETAILED DESCRIPTION OF THE INVENTION

Figure 1:
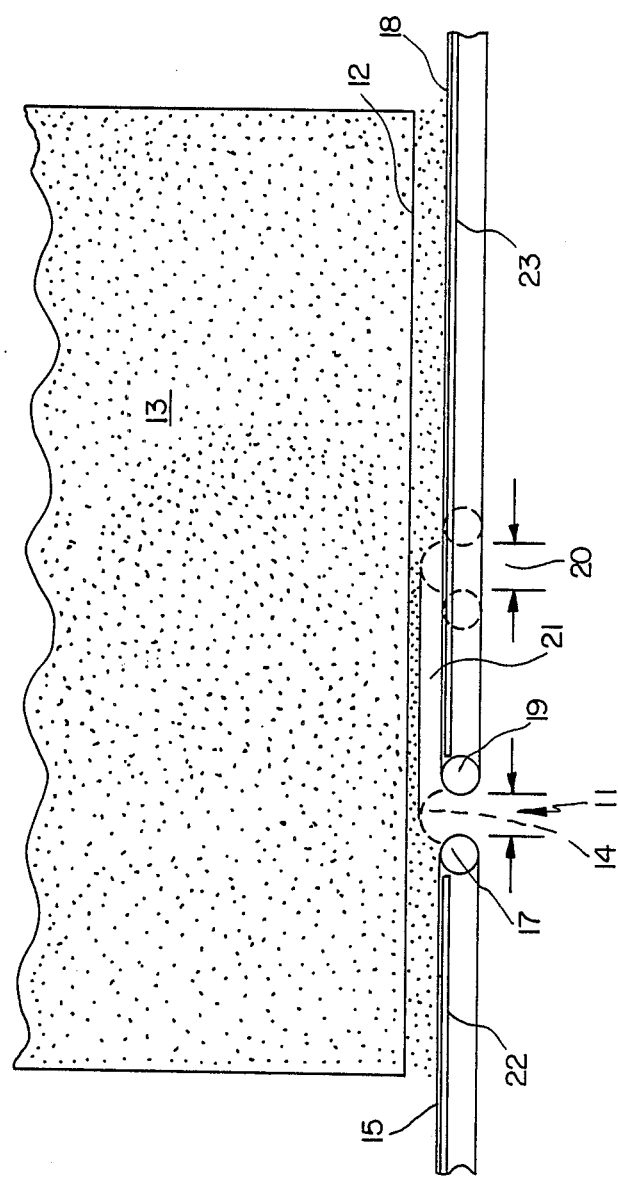
FIG. 1 is a simplified plan view of a first embodiment of the invention.

Referring to FIG. 1, the concept of the invention involves traversing the opening 11 back and forth along the entire length of the bin or hopper outlet 12. The width of the opening 11 may be chosen to suit the flow characteristics of the stored bulk material 13. If the opening 11 is chosen to be sufficiently narrow for a stable arch 14 of the bulk material 13 to form over it then the opening 11 may be left stationary under the hopper outlet without excessive flow of materials, as a stable arch 14 will form. A wider opening 11 would result in a greater flow out of the opening when the opening is stationary and accordingly it would be necessary to move opening 11 to one side and out from under the hopper opening to stop or "park" it. Of course, opening 11 must be sufficiently wide to allow passage of the largest particle size of the bulk material through it. Another consideration in the selection of the width of the opening 11 is the desired volume of the bulk material 13 to be withdrawn with each traverse of the opening. The opening 11 will also preferably span the full width of the bin or hopper outlet 12 to avoid stagnant areas in the bin.

Assuming a right to left movement of the opening 11 shown in FIG. 1, this movement is achieved by having the belt 15 unfold from under the bin outlet 12 at the leading pulley 17 and at the same time, the belt 18 covering the bin outlet at the trailing pulley 19 as the opening 11 formed by pulleys 17 and 19 moves uniformly from right to left. The amount of material withdrawn from the bin by movement of the opening 11 from its previous position 20 to position 11 is illustrated by the unshaded area 21. The support decks 22 and 23 also traverse with the opening 11. However, movement of the opening 11 over the full length of the bin outlet 12 is achieved without any sliding action of the belts 15 and 18 against the stored bulk material 13 at the bin outlet 12. Hence, no consolidation of the stored bulk material can occur at the outlet due to the action of the discharge feeder.

In the embodiment of the feeder design illustrated, in FIG. 1, belts 15 and 18 are supported from underneath by decks 22 and 23 respectively, at the bin outlet 12. As the traverse of the opening 11 must cover the extreme ends of the bin, the overall length of the belts 15 and 18 and the support decks 22 and 23 must each be at least double the length of the bin or hopper outlet 12. Hence another design requirement is to accommodate the excess lengths of the belts and the decks. Several configurations utilizing the above concepts are described below. The present invention is however, not limited to these configurations. Also, if a flexible belt is provided which yet has sufficient rigidity to support the stored materials, the decks may be dispensed with.

Figure 2:
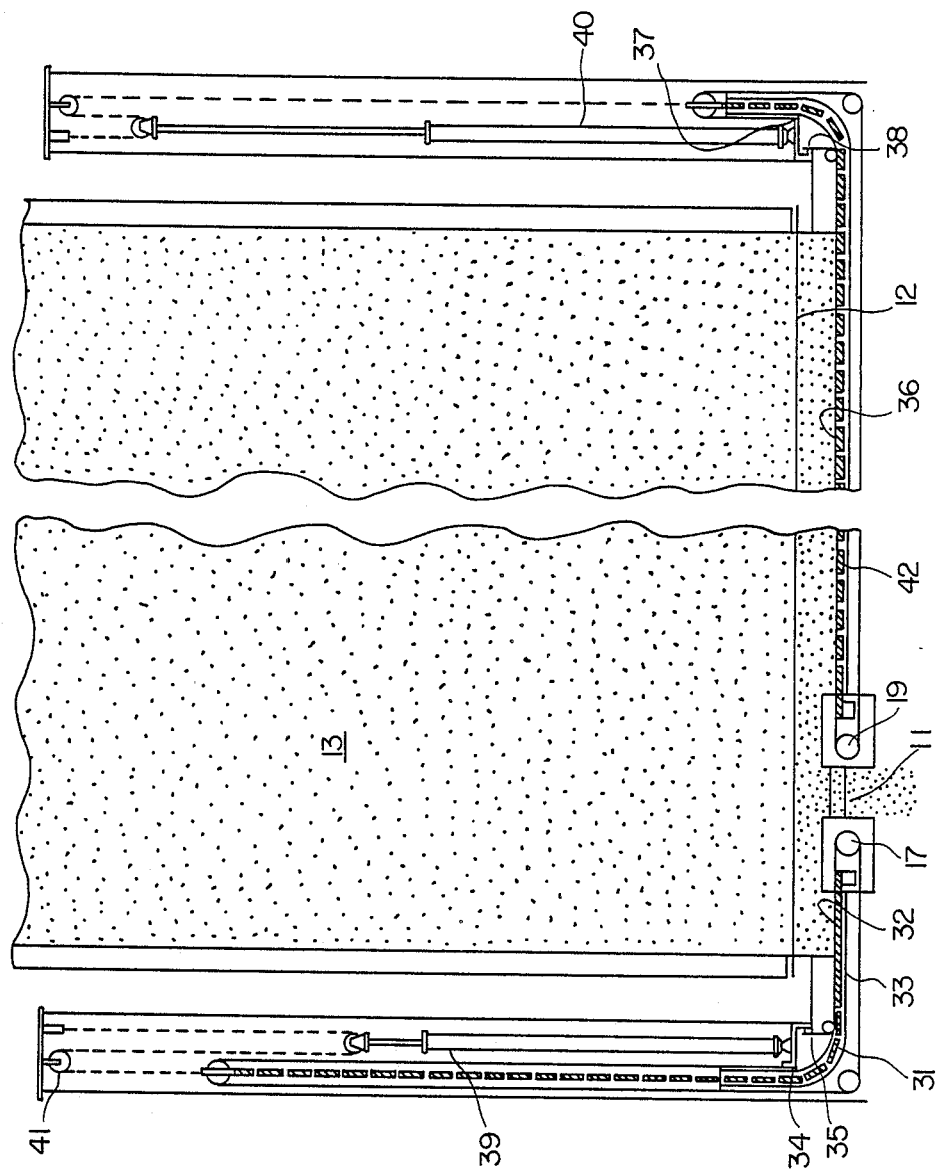
FIG. 2 is a simplified plan view of a second embodiment of the invention where the excess lengths of the belts and the support decks are accommodated vertically along the sides of the bin or hopper.

FIG. 2 shows the essential features of a configuration of the invention where the excess lengths of the belts and the support decks are accommodated vertically along the sides of the bin. The deck lengths on both sides of the opening are made up of a number of sections 31 supporting a flexible belt 32. The sections 31 are hinged or otherwise suitably connected to allow them to roll up and down guide rails 33. The belt 32 is anchored at locations 34 and 35. Similarly, belt 36 is anchored at locations 37 and 38. Traversing of the opening 11 is achieved by hydraulic cylinders 39 and 40 located on each end of the bin. A reversible motor can also be used instead of the hydraulic cylinders. The two pulleys 17 and 19 are connected by adjustable tie rods or the like to either side of opening 11 so that the entire system operates as a unit under tension.

For right-to-left movement of the opening 11, the hydraulic cylinder 39 pulls the support deck 31 and belt 32 up towards pulley 41. Pulleys 17 and 19 which are connected to the support deck 31 and 42 also move right to left. The flexible belt 32 unfolds from under the bin outlet 12 at the leading pulley 17 while at the same time, belt 36 covers the outlet at the trailing pulley 19. Movement of the opening 11 is achieved without any frictional force between the bulk material at the bin outlet 12 and the top of belts 32 and 36. The only major frictional force that has to be overcome is that between the underside of the flexible belts 32 and 36 and the top surface of the supporting decks 31 and 42. Left-to-right movement of the opening 11 is obtained by the hydraulic cylinder 40 on the right-hand side of the bin, in a manner similar to that described above. Movement of the opening can also be achieved by means of a reversible motor instead of hydraulic cylinders 39 and 40.

Figure 3:
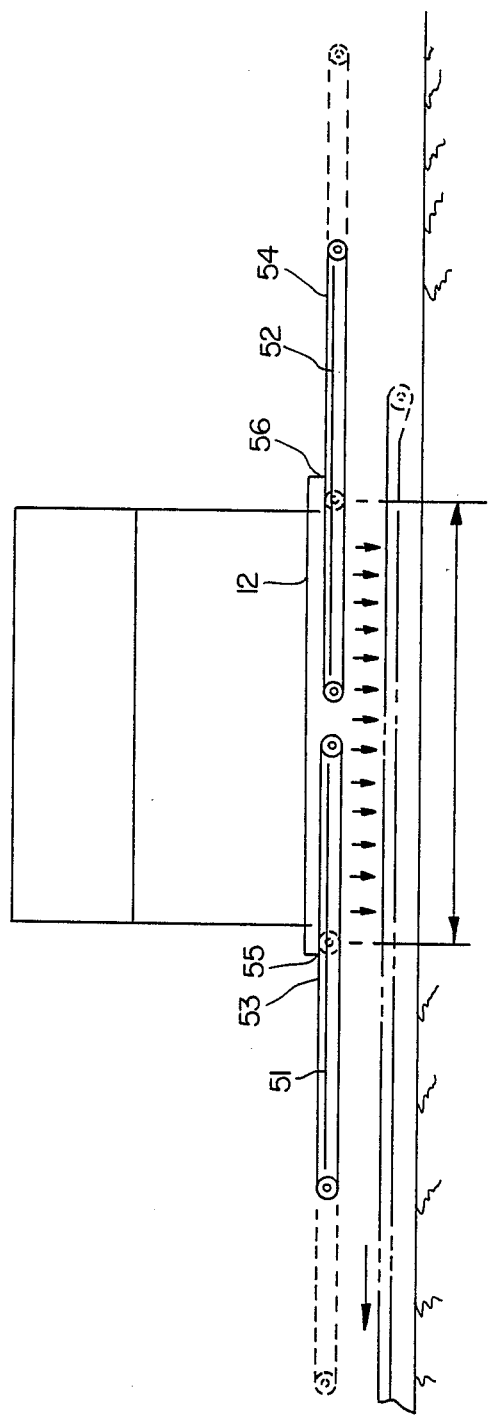
FIG. 3 is a simplified plan view of an embodiment of the invention utilizing horizontal rigid support decks.
Figure 4:
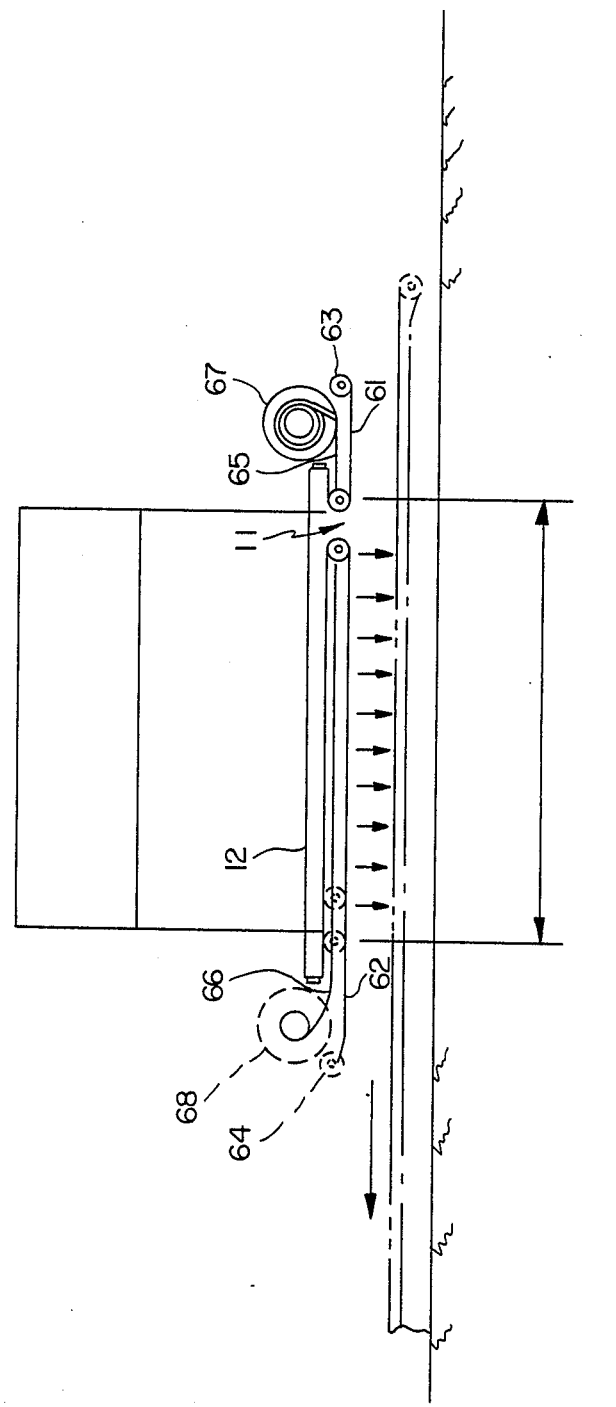
FIG. 4 is a simplified plan view of a further embodiment of the invention in which the excess lengths of the belts and support decks are wound on to spools.
Figure 5:
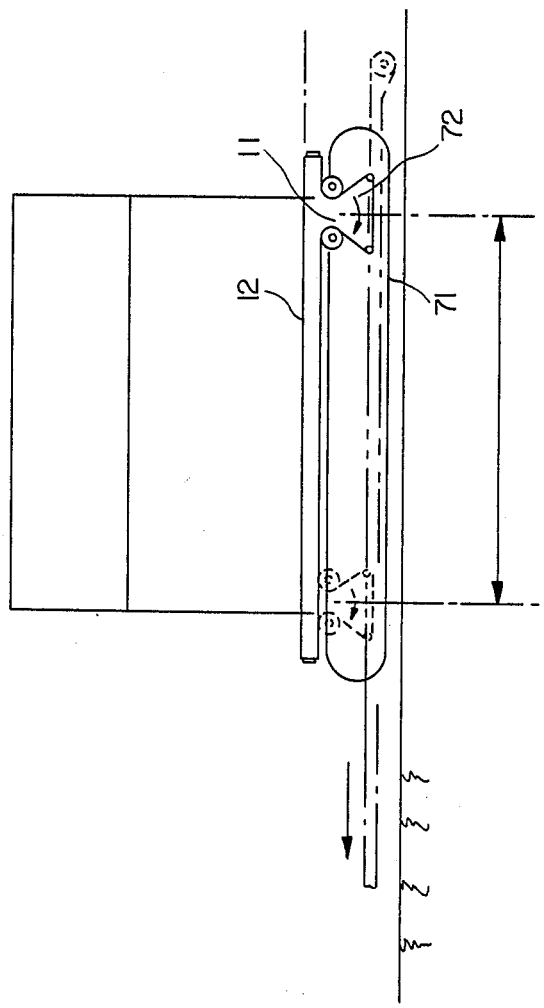
FIG. 5 is a simplified plan view of a further embodiment of the invention with the excess lengths of the support decks accommodated under the bin or hopper outlet.

Configuration of the invention described in FIG. 2 is feasible only if sufficient head space is available to accommodate the deck on both ends of the bin. FIGS. 3 to 5 illustrate other configurations that may be used.

FIG. 3 shows a configuration with rigid decks 51 and 52 supporting belts 53 and 54 which are anchored at locations 55 and 56 respectively. For long storage bins or hoppers, this configuration clearly requires a large floor area for deck travel.

FIG. 4 illustrates a configuration of the invention having a more compact deck design than configurations described in FIGS. 2 and 3. The belts 61 and 62 are wound on to spools 63 and 64 respectively as the opening 11 traverses the length of the bin outlet 12. Similarly, the supporting decks 65 and 66 are wound to spools 67 and 68 respectively. The supporting decks 65 and 66 are designed to be flexible along the length of the bin outlet 12 as shown for the configuration of the invention in FIG. 2.

FIG. 5 shows a configuration of the invention in which the excess length of the feeder supporting deck 71 is accommodated underneath the bin outlet 12. In this configuration, bulk material discharged by the feeder must be removed between the top and bottom parts of the support deck. Conveyor 72 which traverses with the opening 11, removes the bulk material between the top and bottom sections of the feeder deck. Alternatively, a chute in the place of a traversing conveyor can be used.

FIG. 6 illustrates an embodiment of the invention utilizing multiple discharge openings 80 and 81. The use of multiple openings allows a reduction in the distance each opening must traverse for the entire bin opening to be covered, thereby reducing the length and cost of the feeder. For example, with two openings as illustrated in FIG. 6, the length of the feeder deck is reduced by half. Another effect of multiple openings is that for a given width of the opening and speed of traversing, a higher rate of discharge of the stored bulk material is achieved.

The support deck 82 illustrated in FIG. 6 consists of individual idlers which support the flexible belt 15 while minimizing friction between the belt and the idlers.

FIG. 7 illustrates an extreme example of the use of multiple openings wherein the flexible belt has been dispensed with entirely. The distance between idlers is chosen such that an arch is formed to support the material and end the discharge is achieved by the idlers are stationary. The discharge is achieved by the idlers traversing the openings 80. The distance which the idlers must travel is limited to the distance between two adjacent idlers. As in the case of a flexible belt, the idlers rotate as they move transversely such that the surface of the idler remains stationary with respect to the bulk material.

Figure 8:
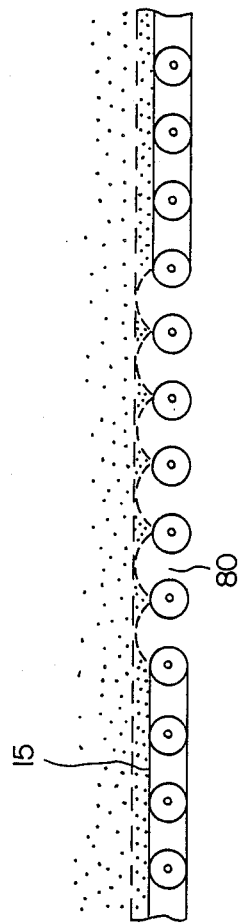
FIG. 8 illustrates a further embodiment of the invention combining the features of the embodiments in FIGS. 6 and 7.

A compromise between making the opening 11 narrow enough so that the bulk material will arch and not flow when the opening is stationary, and yet have the opening large enough for sufficient discharge of material per traverse of the opening is shown illustrated in FIG. 8. The material is discharged through multiple openings 80 similar to those shown in FIG. 7, the width of each opening 80 being sufficiently small for material to bridge over it. These openings 80 are formed by idlers spaced between the two flexible belts 15, and thus opening 11 is in effect subdivided into smaller openings in this embodiment.

Figure 9:
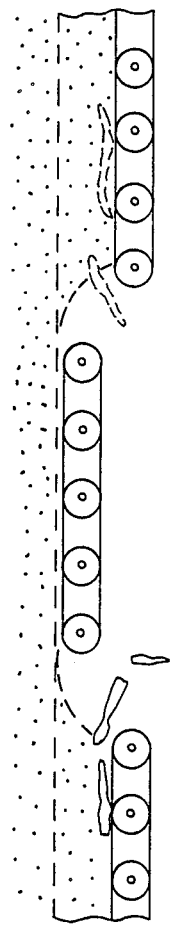
FIG. 9 illustrates in simplified plan view a section of an embodiment of the invention having feeder decks at different heights to allow passage of large particles.

FIG. 9 illustrates an embodiment of the invention in which the feeder decks on each side of an opening are at different heights to allow the passage of large particles of the stored material through the opening.

As will be apparent to those skilled in the art in the light of the foregoing disclosure, many alterations and modifications are possible in the practice of this invention without departing from the spirit or scope thereof. For example, while supporting decks have been illustrated to increase the weight supported by the flexible belts, the nature of the stored material or composition of such flexible belts may make such support decks unnecessary. Accordingly, the scope of the invention is to be construed in accordance with the substance defined by the following claims.

I claim:

1. A discharge feeder for the feeding of bulk particulate materials from a storage bin or hopper, comprising:
   (a) first and second flexible closure members spaced horizontally to form an opening of a predetermined width extending across said bin between said first and second flexible closure members;
   (b) said first and second flexible closure members each comprising a flexible belt member having an upper surface for supporting siad bulk materials and a first pulley member adjacent said opening; and,
   (c) means for translating said first pulley members along a length of said bin in a direction perpendicular to said opening, whereby said opening may be caused to traverse back and forth along the length of said bin by movement of said pulleys, and whereby the upper surfaces of said flexible belt members remain substantially stationary with respect to said materials when in contact with the said materials, and said first flexible belt member is drawn away from said materials around a first pulley member which is foremost in the direction of motion as said foremost first pulley member moves beneath said materials, a portion of said materials thereby being discharged through said opening, while said second flexible belt member is drawn around a first pulley member which is rearmost in the direction of motion, said rearmost first pulley member being drawn into stationary supporting contact with said materials.

2. The discharge feeder of claim 1 wherein the width of said opening is selected according to the flow characteristics of said bulk particulate materials such that an arch of said materials is formed when said opening is stationary below said storage bin, preventing further discharge from said opening.

3. The discharge feeder of claim 1 further incorporating a supporting planar element located below the supporting surface of each said flexible belt and adapted to be moved back and forth in association with each said first pulley member.

4. The discharge feeder of claim 1 wherein a point on said flexible belt is secured relative to said storage bin.

5. The discharge feeder of claim 1 wherein said opening extends across the entire width of said storage bin.

6. The discharge feeder of claim 4 wherein each said flexible member further comprises a second pulley member spaced at a fixed horizontal distance from said first pulley member and which receives said flexible belt member for continuous motion thereabout.

7. The discharge feeder of claim 6 wherein said means for translating said first pulley member comprises motive means adapted to raise and lower said second pulley member in a direction perpendicular to the direction of motion of said first pulley member.

8. The discharge feeder of claim 7 further incorporating an articulated supporting element located below the supporting surface of said flexible belt member and adapted to be moved back and forth in association with said first pulley member.

9. The discharge feeder of claim 4 wherein one end of said flexible belt member is alternately reeled and unreeled about a spindle member in accordance with the back and forth movement of said first pulley member.

10. The discharge feeder of claim 3 wherein said supporting planar element is alternately reeled and unreeled about a spindle in accordance with the back and forth movement of said first pulley members.

11. The discharge feeder according to claim 1 wherein said first flexible belt member is connected to said second flexible belt member to form a third flexible belt member, said third flexible belt member having fixed ends, and wherein said discharge feeder further comprises second and third pulley members located beneath each of said first pulley members and adapted to guide said third flexible belt member downwardly and away from said opening, means located beneath said opening for transporting said discharged bulk materials, and means for translating each of said first pulley members and said second and third pulley members along the length of said bin whereby said opening may be caused to traverse back and forth along the length of said bin and whereby the upper surface of said third flexible belt member remains substantially stationary with respect to said materials when in contact with said materials, and is drawn away from said materials and around one of said first pulley members as said one first pulley member moves beneath said materials, thereby discharging a portion of said materials through said opening and onto said means for transporting said discharged materials, and returns to a stationary support contact with said materials around said one first pulley member.

* * * * *